(12) United States Patent
Farrell

(10) Patent No.: X7858
(45) Date of Patent: Dec. 16, 1833

(54) CANDLES, COMPOSITION FOR

(76) Inventor: Philip Farrell

Philip Farrell's Composition for Candles
Letters Patent

The Schedule referred to in these Letters Patent and making part of the same containing a description in the words of the said Philip Farrell himself of his improvement being a discovery in the composition and mode of making candles

---

Be it known that I Philip Farrell of the City, County and State of New York have made an improvement in the useful arts being a discovery in the composition & mode of making candles which is described as follows. Take 100 lbs of melted tallow prepared in the usual way; Take 12 or 15 lbs of white pine turpentine, boil it ^in water about 2½ hours for evaporating its oil or spirits. Mix the tallow and turpentine thus prepared with which make candles, by dipping or casting in the usual way).

With this composition good cheap candles can be made much cheaper than in the common mode, the saving being in the difference of the price of tallow & turpentine used. The tallow costing ^about 9 a 10 cents and the turpentine about 1 or 2 cents per lb. to be prepared both together. The discovery here claimed and desired to be secured by Letters Patent consists in using a quantity of boiled white pine turpentine, with melted tallow, instead of tallow alone in making candles, being a great saving in the expense Witnesses
W. P. Elliot
Saml P. Walker Philip Farrell Recd.
[illegible]

[illegible]